（12） United States Patent
Martin et al.

(10) Patent No.: US 12,105,637 B2
(45) Date of Patent: Oct. 1, 2024

(54) INSTANCE BASED ACTIVE DATA STORAGE MANAGEMENT

(71) Applicant: EMC IP Holding Company LLC, Hopkinton, MA (US)

(72) Inventors: Owen Martin, Hopedale, MA (US); Vladimir Desyatov, Hollis, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 16/658,842

(22) Filed: Oct. 21, 2019

(65) Prior Publication Data

US 2021/0117336 A1 Apr. 22, 2021

(51) Int. Cl.
*G06F 12/121* (2016.01)
*G06F 3/06* (2006.01)

(52) U.S. Cl.
CPC .......... *G06F 12/121* (2013.01); *G06F 3/0611* (2013.01); *G06F 3/0649* (2013.01); *G06F 3/0685* (2013.01); *G06F 2212/1024* (2013.01)

(58) Field of Classification Search
CPC ...... G06F 12/121; G06F 12/12; G06F 12/122; G06F 12/123; G06F 12/124; G06F 12/125; G06F 12/126; G06F 12/127; G06F 12/128; G06F 3/061; G06F 3/0611; G06F 3/0638; G06F 3/0647; G06F 3/0649; G06F 3/0685; G06F 2212/1024; G06F 16/185

See application file for complete search history.

(56) References Cited

U.S. PATENT DOCUMENTS

| | | | | |
|---|---|---|---|---|
| 8,583,838 B1* | 11/2013 | Marshak | ............... | G06F 3/0649 710/16 |
| 9,053,114 B1* | 6/2015 | Lemar | ..................... | G06F 3/067 |
| 9,940,060 B1* | 4/2018 | Colgrove | .............. | G06F 3/0641 |
| 2009/0037479 A1* | 2/2009 | Bolik | ..................... | G06F 16/185 |
| 2010/0281230 A1* | 11/2010 | Rabii | .................... | G06F 12/121 711/165 |
| 2011/0271071 A1* | 11/2011 | Nakatogawa | ......... | G06F 3/0665 711/E12.002 |
| 2012/0110259 A1* | 5/2012 | Mills | .................... | G06F 3/0685 711/113 |
| 2014/0325115 A1* | 10/2014 | Ramsundar | ........... | G06F 3/0688 711/163 |
| 2014/0379991 A1* | 12/2014 | Lomet | ................. | G06F 12/0891 711/135 |

(Continued)

*Primary Examiner* — Michael Krofcheck
(74) *Attorney, Agent, or Firm* — Krishnendu Gupta; Nikhil Patel (57) ABSTRACT

Embodiments of the present disclosure relate to active data placement. An input/output (I/O stream of data operations is monitored. One or more data units corresponding to each data operation is identified. Based on the identified one or more data units a data structure comprising a list of data unit records is updated, a determination is made whether to transfer one or more data units in the list of data unit records from a slow media class storage to a fast media class storage, a determination is made whether to transfer one or more data units in the fast media class storage to the slow media class storage, and the one or more data units in the list of data unit records is transferred between the fast media class storage and the slow media class storage based on the determinations.

20 Claims, 8 Drawing Sheets

(56) References Cited

U.S. PATENT DOCUMENTS

| | | | |
|---|---|---|---|
| 2015/0006787 A1* | 1/2015 | Liu | G06F 3/0685 |
| | | | 711/103 |
| 2015/0149730 A1* | 5/2015 | Hu | G06F 3/067 |
| | | | 711/136 |
| 2016/0077750 A1* | 3/2016 | Erdmann | G06F 3/0685 |
| | | | 711/114 |
| 2016/0085691 A1* | 3/2016 | Benedict | G06F 12/0891 |
| | | | 711/136 |
| 2017/0060980 A1* | 3/2017 | Harris, Jr. | G06F 16/185 |
| 2018/0052887 A1* | 2/2018 | Soncodi | G06F 9/5005 |
| 2018/0059952 A1* | 3/2018 | Andrews | G06F 3/0605 |
| 2019/0354289 A1* | 11/2019 | Ramachandran | G06F 3/0664 |
| 2020/0326871 A1* | 10/2020 | Wu | G06F 3/0679 |
| 2021/0081320 A1* | 3/2021 | Tian | G06F 12/0868 |

* cited by examiner

INSTANCE BASED ACTIVE DATA STORAGE MANAGEMENT

BACKGROUND

Memory management is a form of resource management applied to computer memory. Memory management can be used to provide ways to dynamically allocate portions of memory to programs at their request, and free it for reuse when no longer needed. Enabling more efficient memory management can be important to computer systems where more than a single process might be underway at any time.

SUMMARY

One or more aspects of the present disclosure relates to active data placement. An input/output (I/O) stream of data operations is monitored. One or more data units corresponding to each data operation is identified. Based on the identified one or more data units a data structure comprising a list of data unit records is updated, a determination is made whether to transfer one or more data units in the list of data unit records from a slow media class storage to a fast media class storage, a determination is made whether to transfer one or more data units in the fast media class storage to the slow media class storage, and the one or more data units in the list of data unit records is transferred between the fast media class storage and the slow media class storage based on the determinations.

In embodiments, an I/O record for each data operation can be generated.

In embodiments, the one or more data unit corresponding to each data operation and an extent corresponding to each data based on address information included in the I/O record can be identified.

In embodiments, a determination can be made whether each extent corresponding to each data unit of the I/O stream can be stored in the data structure.

In embodiments, based on the determination, one or more of the following can be performed: adding each data unit record from the I/O stream not included in the list of data unit records, removing a previous stored data unit record from the data structure, updating a storage promotion rank for each data unit record in the data structure, and updating an eviction rank for each data unit record in the data structure.

In embodiments, the one or more data units in the list of data unit records can be transferred from the slow media class storage to the fast media class storage based on the storage promotion rank of each data unit record.

In embodiments, one or more data units can be transferred from the fast media class storage to the slow media class storage based on the storage promotion rank of each data unit record stored in the fast media class storage.

In embodiments, the one or more data unit records can be evicted from the data structure based on the eviction rank of each data unit record.

In embodiments, one or more previous stored data unit records can be removed from the data structure based on available memory associated with the data structure.

In embodiments, each data unit record transferred from the fast media class storage to the slow media class storage can be added to the data structure based on each transferred data unit record's promotion rank.

In embodiments, each data unit record transferred from the fast media class storage to the slow media can be added to the data structure, An amount of previously stored data unit record can be removed based on one or more of: an eviction rank of each previously stored data unit record, the available memory associated with the data structure, and an amount of data unit records transferred from the fast media class to the slow media class.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Some embodiments for memory management include migrating tracks of data units between different types of storage media (e.g., fast and slow) based on how frequently tracks of data units are accessed. Tracks of data units that are frequency accessed (e.g., having accesses above an access threshold) are considered "hot" tracks. The embodiments can move hot tracks to fast storage media to ensure fast response times, while tracks that are not hot can be moved to slow storage media.

One embodiment for hot data detection and ranking is based on a periodic calculation of moving averages (MA) for addressed data units. Data can be sorted based on the MA to determine the most active data units. Although such embodiments can identify hot data, they require a lot of resources (e.g., memory and CPU (central processing unit) resources). For example, to calculate MA, the embodiments need to collect statistics for several sample intervals before they can make MA calculations and a final ranking list. It can be appreciated that these embodiments cannot produce a ranking list instantly. It can be further appreciated that by the time an MA based ranking list is ready, a pattern (e.g., workload pattern) of the I/O stream may have changed. Thus, the MA based ranking list may have periods of inaccuracy.

Embodiments of the present disclosure use instance based (IB) learning to quickly identify and rank active address space data units. For example, IB learning can provide for directly analyze an I/O stream to evaluate the data units that are candidates for promotion from slow storage media (NOT-AND ("NAND")) memory to fast storage media (e.g., storage class memory ("SCM")). In embodiments, high resolution extents associated with the data units can be clustered into categories for promotion, demotion, or no action (e.g., neutral).

Embodiments disclosed herein can evaluate a degree of activity of data units by the duration of their storage in a media class. To continue to be stored in a particular storage media, e.g., a fast media class, a data unit must maintain a certain level of activity which can be defined using the following equations:

1. EQ1: $R\_(data\_unit)$ can define an average repeated access count for a data unit in an I/O stream),
   where $R\_(data\_unit)$ is a total count of events between accesses to a data unit divided by a total number of times the data unit was accessed.
2. EQ2: $1/R\_(data\_unit)$ can be a probability of observing a data unit in an I/O stream.
3. EQ3: $(1-1/R\_(data\_unit)$ can be a probability of missing the data unit in the media class if a media class has a size of 1 data unit, can be).
4. EQ4: $(1-1/R\_(data\_unit))^2$ can be a probability of missing the data unit in an I/O stream for a media class size of 2 data units.
5. EQ5: $[(1-1/R\_(data\_unit))]^{\wedge}N$ can be a probability of missing a data unit for media class size of N data units.
6. EQ6: $[(1-1/R\_(data\_unit))]^{\wedge}N$ As such, a probability of hitting a data unit in media class of size N, e.g., $P\_(data\_unit)$, can equal.
7. EQ7: $[HR]\_(data\_unit)$ can be a hit ratio of the data unit, which can equal $P\_(data\_unit)$,
   where $P\_(data\_unit)$ is a probability of getting a cache hit on the data unit.
8. EQ8: $[HR]\_(media\_class)$ can be is the average hit ratio for all data units staying in media class. Thus, for a subject data unit to be competitive with other data units to keep its place in a media class, $[HR]\_(data\_unit)$ can be greater than or equal to ($\geq$) $[HR]\_(media\_class)$.
9. EQ9: $[1-(1-1/R\_(data\_unit))]^{\wedge}N$ can be $\geq[HR]\_(media\_class)$.
10. EQ10: $R\_(data\_unit) \leq 1/(1-\sqrt{(1A-[HR]\_(media\_class))})$ can define when a data unit may remain stored within a media class.

Embodiments described herein cause data units to compete to remain stored in any given storage media. For example, the more active a data unit is (e.g., the more often it is accessed) the longer the data unit can be allowed to remain in a storage media. Thus, embodiments of the present disclosure provide a data structure that stores data units that are ordered by the time of their stay in a storage media. It can be appreciated that using the data structure provides for quickly getting the rank of the most active data units in an I/O stream.

It can be appreciated that the embodiments described herein require less CPU utilization than calculating MA rankings and provide instant availability of a ranking list even if I/O patterns change frequently. In embodiments, IB learning can be used with MA based ranking methods to manage large address spaces.

Figure 1:
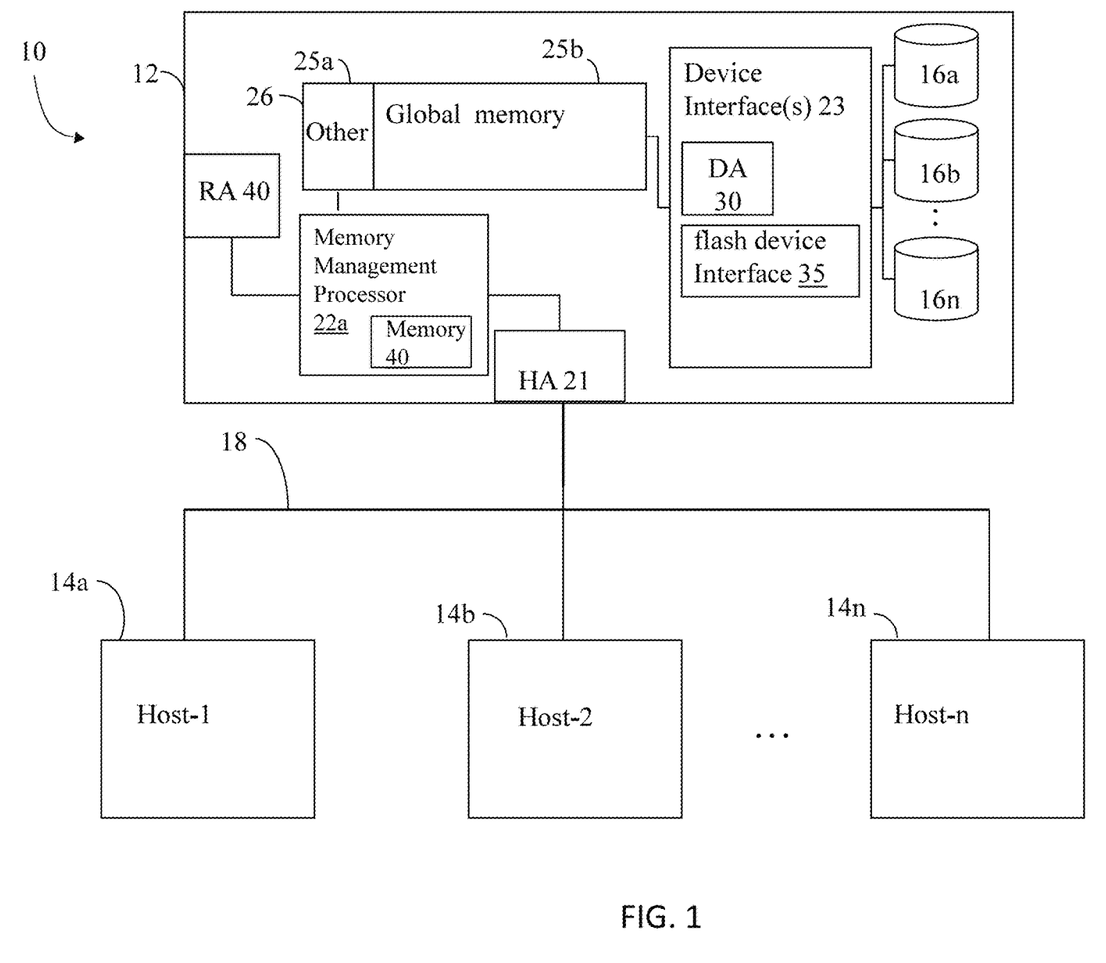
FIG. 1 is a block diagram of an example a storage system in accordance with example embodiments disclosed herein.

Referring to FIG. 1, shown is an example of an embodiment of a system 10 that may be used in connection with performing the embodiments described herein. The system 10 includes a data storage system 12 connected to host systems 14a-14n through communication medium 18. In embodiments, the hosts 14a-14n can access the data storage system 12, for example, to perform input/output (I/O) operations or data requests. The communication medium 18 can be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host 14a-14n can access and communicate with the data storage system 12. The hosts 14a-14n can also communicate with other components included in the system 10 via the communication medium 18.

Each of the hosts 14a-14n and the data storage system 12 can be connected to the communication medium 18 by any one of a variety of connections as may be provided and supported in accordance with the type of communication medium 18. The processors included in the hosts 14a-14n may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage system 12 are described herein in more detail and can vary with each embodiment. Each of the hosts 14a-14n and data storage system 12 can all be located at the same physical site or can be located in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-14n and data storage system 12 can be connected to the communication medium may pass through other communication devices, such switching equipment that may exist such as a phone line, a repeater, a multiplexer or even a satellite.

Each of the hosts 14a-14n can perform different types of data operations in accordance with different types of tasks. In embodiments, any one of the hosts 14a-14n may issue a data request to the data storage system 12 to perform a data operation. For example, an application executing on one of the hosts 14a-14n can perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the embodiments herein. It should also be noted that an embodiment may include data storage arrays or other components from one or more vendors. In subsequent examples illustrated the embodiments herein, reference may be made to a single data storage array by a vendor, such as by DELL Technologies of Hopkinton, Massachusetts. However, as will be appreciated by those skilled in the art, the embodiments herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The embodiments described herein can be used in an embodiment in which one or more of the devices 16a-16n are flash drives or devices. More generally, the embodiments herein may also be used with any type of SSD although following paragraphs can refer to a particular type such as a flash device or flash memory device.

The data storage array 12 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-14n and the global memory (GM) 25b. In an embodiment, the HA 21 may be a Fibre Channel Adapter (FA) or another adapter which facilitates host communication. The HA 21 may be characterized as a front-end component of the data storage system 12 which receives a request from one or more of the hosts 14a-14n. The data storage array 12 can include one or more RAs (e.g., RA 40) that may be used, for example, to facilitate communications between data storage arrays. The data storage array 12 may also include one or more device interfaces 23 for facilitating data transfers to/from the data storage devices 16a-16n. The data storage interfaces 23 may include device interface modules, for example, one or more disk adapters (DAs) 30 (e.g., disk controllers), flash drive interface 35, and the like. The DA 30 can be characterized as a back-end component of the data storage system 12 which interfaces with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, may also be included in an embodiment.

Host systems 14a-14n provide data and access control information through channels to the storage systems 12, and the storage systems 12 may also provide data to the host systems 14a-14n also through the channels. The host systems 14a-14n do not address the drives or devices 16a-16n of the storage systems directly, but rather access to data can be provided to one or more host systems 14a-n from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array 12, may be accessed by multiple hosts allowing the hosts to share the data residing therein. The HA 21 may be used in connection with communications between a data storage array 12 and one or more of the host systems 14a-n. The RA 40 may be used in facilitating communications between two data storage arrays. The DA 30 may be one type of device interface used in connection with facilitating data transfers to/from the associated disk drive(s) 16a-n and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA 30 that accomplishes the foregoing by creating job records for the different LVs associated with a device. These different job records may be associated with the different LVs in a data structure stored and managed by each device interface.

A memory management processor 22a that can be used to manage memory (e.g., active data placement) of the system 12. In one embodiment, the memory management processor 22a may be used in monitoring processing threads, for example, regarding I/O processing threads in connection with data storage system 12. Accordingly, the memory management processor 22a can, for example, use instance based (IB) embodiments to allocate data units between different classes of memory (e.g., fast storage media and slow storage media). Additional details regarding the memory management processor 22a are described in following paragraphs.

Although the memory management processor 22a is depicted within the system 12, it should be noted that a memory management processor 22a may exist external to the data storage system 12. Accordingly, the processor 22a may communicate with the data storage system 12 using any one of a variety of communication connections. In one embodiment, the memory management processor 22a may communicate with the data storage system 12 through three different connections, a serial port, a parallel port and using a network interface card, for example, with an Ethernet connection. Using the Ethernet connection, for example, a memory management processor may communicate directly with DA 30 and HA 21 within the data storage system 12.

Figure 2:
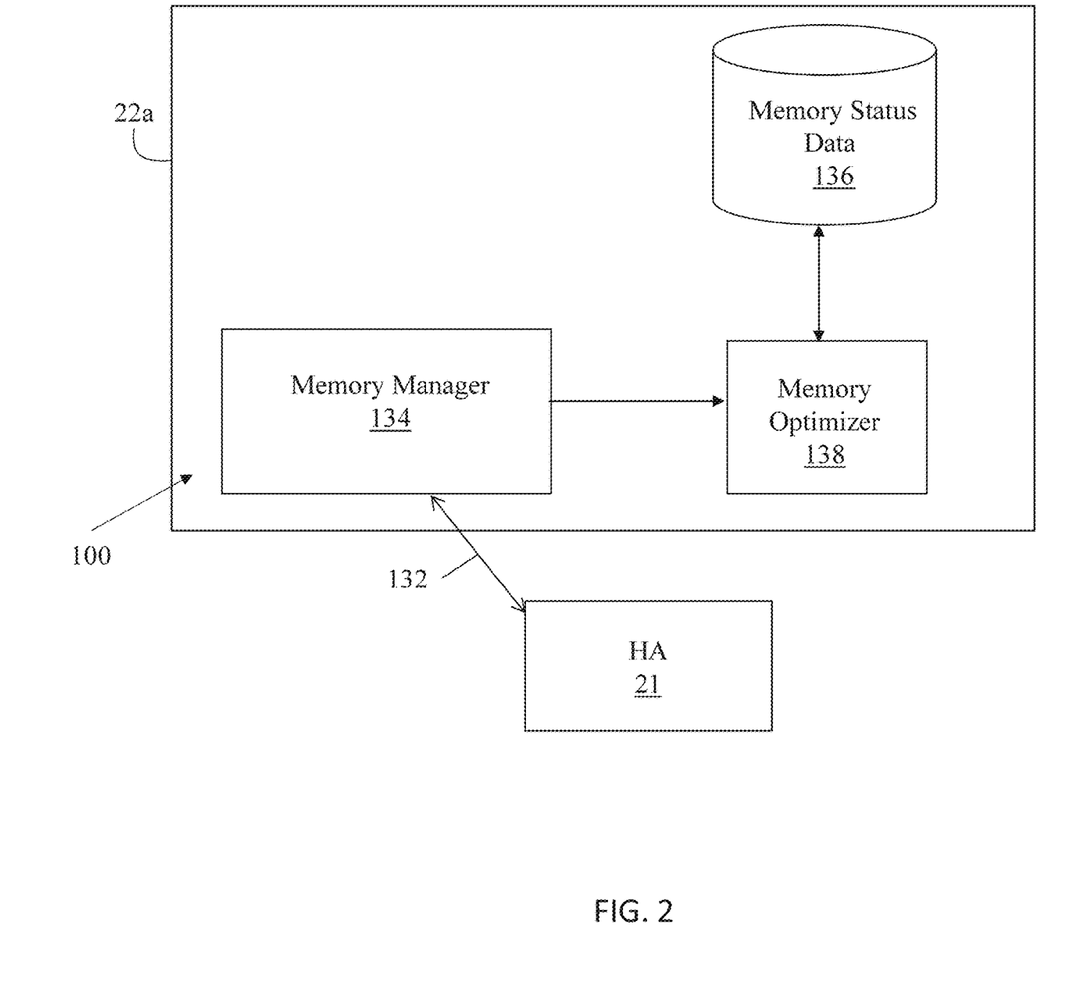
FIG. 2 is a block diagram of a memory management processor (MMP) in accordance with example embodiments disclosed herein.

Referring to FIG. 2, a memory management processor 22a can include elements 100 (e.g., software and hardware elements). It should be noted that the memory management processor 22a may be any one of a variety of commercially available processors, such as an Intel-based processor, and the like. Although what is described herein shows details of software that may reside in the memory management processor 22a, all or portions of the illustrated components may also reside elsewhere such as, for example, on HA 21 or any of the host systems 14a-14n of FIG. 1. In other embodiments, the memory management processor 22a can be a parallel processor such as a graphical processing unit (GPU).

Included in the memory management processor 22a is memory manager 134 that can gather are store memory status data 136 in, e.g., memory 40 of FIG. 1. Memory status data 136 can include memory class information, capacity information, metadata regarding data units stored in each unit of memory, amongst other known types of memory status data. The processor 22a can also monitor input/output (I/O) streams that include operations (e.g., events) such as read/write operations) through the connection 132 with HA 21.

The memory manager 134 can also generate at least one event (e.g., I/O operation with respect to a data unit) from an I/O stream being received by the HA 21. Generating each event can include identifying data units and their corresponding address spaces for each event. For example, the memory manager 134 can identify each I/O operation as, e.g., a read and/or write operation (e.g., event) and determine a data unit that is the target of the operation. For each event, the memory manager 134 can also identify a corresponding extent, device/track, insert an access timestamp, and update an I/O count associated with the extent.

For each identified data unit, a memory optimizer 138 can perform one or more of: update a data structure comprising a list of data unit records, determine whether to transfer one or more data units in the list of data unit records from a slow media class storage to a fast media class storage, determine whether to transfer one or more data units in the fast media class storage to the slow media class storage, and transfer the one or more data units in the list of data unit records between the fast media class storage and the slow media class storage based on the determinations.

For example, the memory optimizer 138 can use instance based (IB) learning to quickly identify and rank active address space data units. For example, IB learning can directly analyze an I/O stream to evaluate the data units that are candidates for promotion from slow storage media (NOT-AND ("NAND") memory to fast storage media (e.g., storage class memory ("SCM")). The memory optimizer 138 can evaluate a degree of activity of data units by the duration of their storage in a media class. To continue to be stored in, e.g., a fast media class, a data unit must maintain a certain level of activity which the optimizer 138 can define based on equations EQ1-EQ10. Accordingly, the memory optimizer 138 can cause data units to compete to remain stored in any given storage media. For example, the more active a data unit is (e.g., the more often it is accessed) the longer the optimizer 138 allows the data unit to remain in a storage media. The optimizer 138 can provide a data structure that stores data units that are ordered by the time of their stay in a storage media. The data structure allows for quickly getting the rank of the most active data units in an I/O stream. Additional details regarding the memory optimizer 138 are described in following paragraphs.

Figure 3:
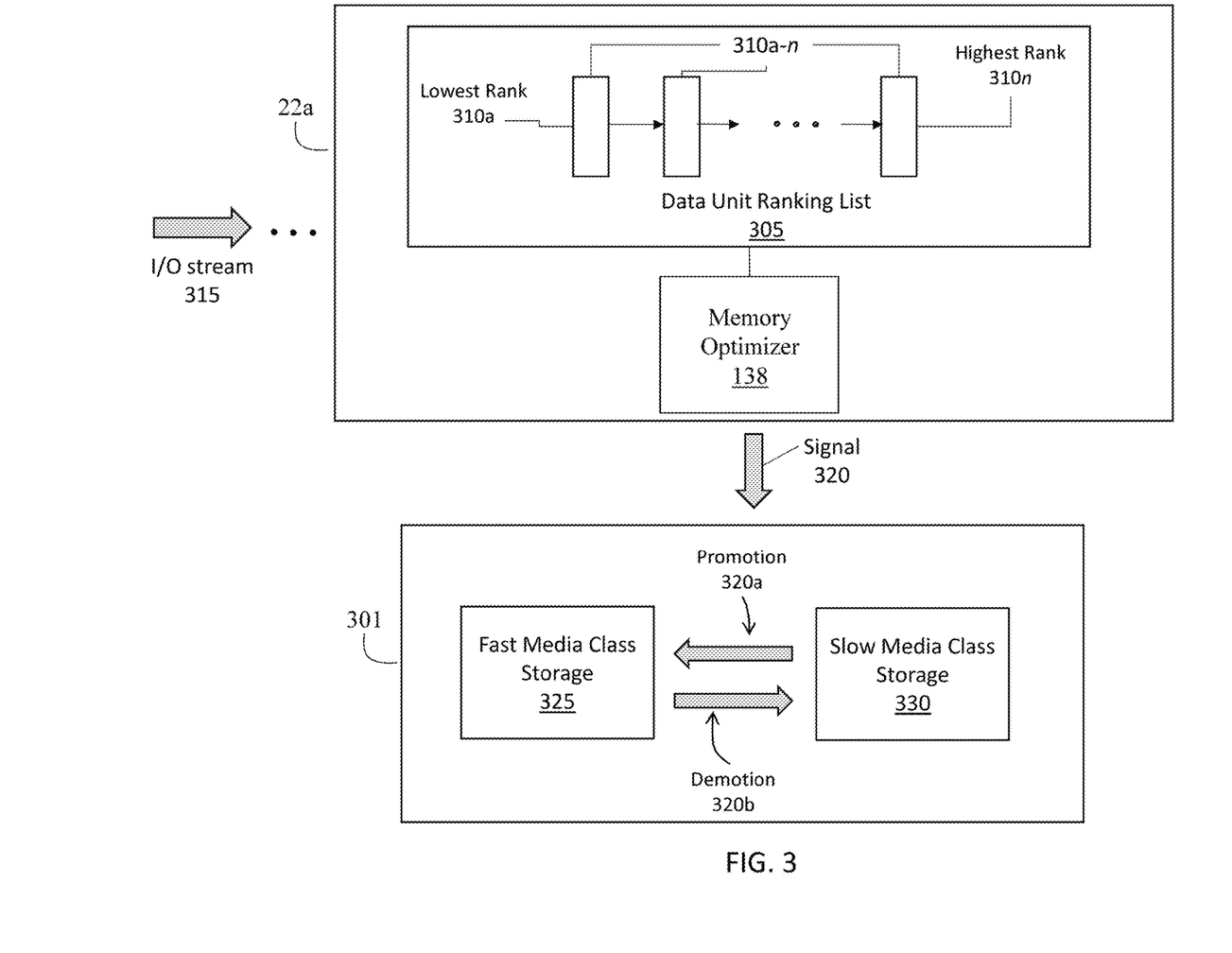
FIG. 3 is a block diagram of an example communication signal issued by an MMP in accordance with example embodiments disclosed herein.

Referring to FIG. 3, a memory management processor 22a receives an I/O stream 315. As described herein, the processor 22a generates one or more events from the I/O stream 315 and identifies each event's corresponding data unit and address space. Using the address space of each data unit, the processor 22a can identify an extent associated with each data unit. For each extent associated with an incoming I/O stream, the memory optimizer 138 adds the extent or updates an existing extent in a "hot" ranking data structure 305. The data structure 305 and all other data structures described herein can be searchable structures such as an index, hash table, a linked list, amongst other known searchable structures. In the embodiment depicted by FIG. 3, the "hot" ranking data structure 305 is a list that ranks extents 310a-n generated from the incoming I/O stream from lowest 310a to highest 310n. The extent with the lowest rank is the least busy (e.g., having the lowest amount associated I/O operations) and the highest rank is the busiest (e.g., having the greatest amount of associated I/O operations). The memory optimizer 138 can calculate a ranking based on one or more of amounts I/O operations (i.e., I/O count) associated with each extent, a duration that each extent is maintained in the "hot" ranking data structure 305, a frequency of I/O counts for each extent over a period, amongst other parameters. In embodiments, the memory optimizer 138 can rank records stored in the "hot" ranking data structure 305 as a function of 'n' (e.g., 2) exponential moving averages of I/O operations (e.g., events) over time. Additionally, the optimizer 138 maintains an MA data structure identifying a moving average (MA of each extent stored in a fast media storage. The extent with a lowest MA is considered a "coldest" extent.

In embodiments, using the "hot" ranking data structure 305 and the MA data structure, the optimizer 138 allocates extents between storage media 301. For example, the storage media 301 can include fast media class storage 325 such as storage class media (SCM) and slow media class storage 330 such as NAND. As discussed in greater detail, the optimizer 138 can identify extents for promotion 320a from slow storage 330 to fast storage 325. Additionally, the optimizer 138 can identify extents for demotion 320b from the fast storage 325 to the slow storage 325 as discussed in greater detail herein.

Figure 4:
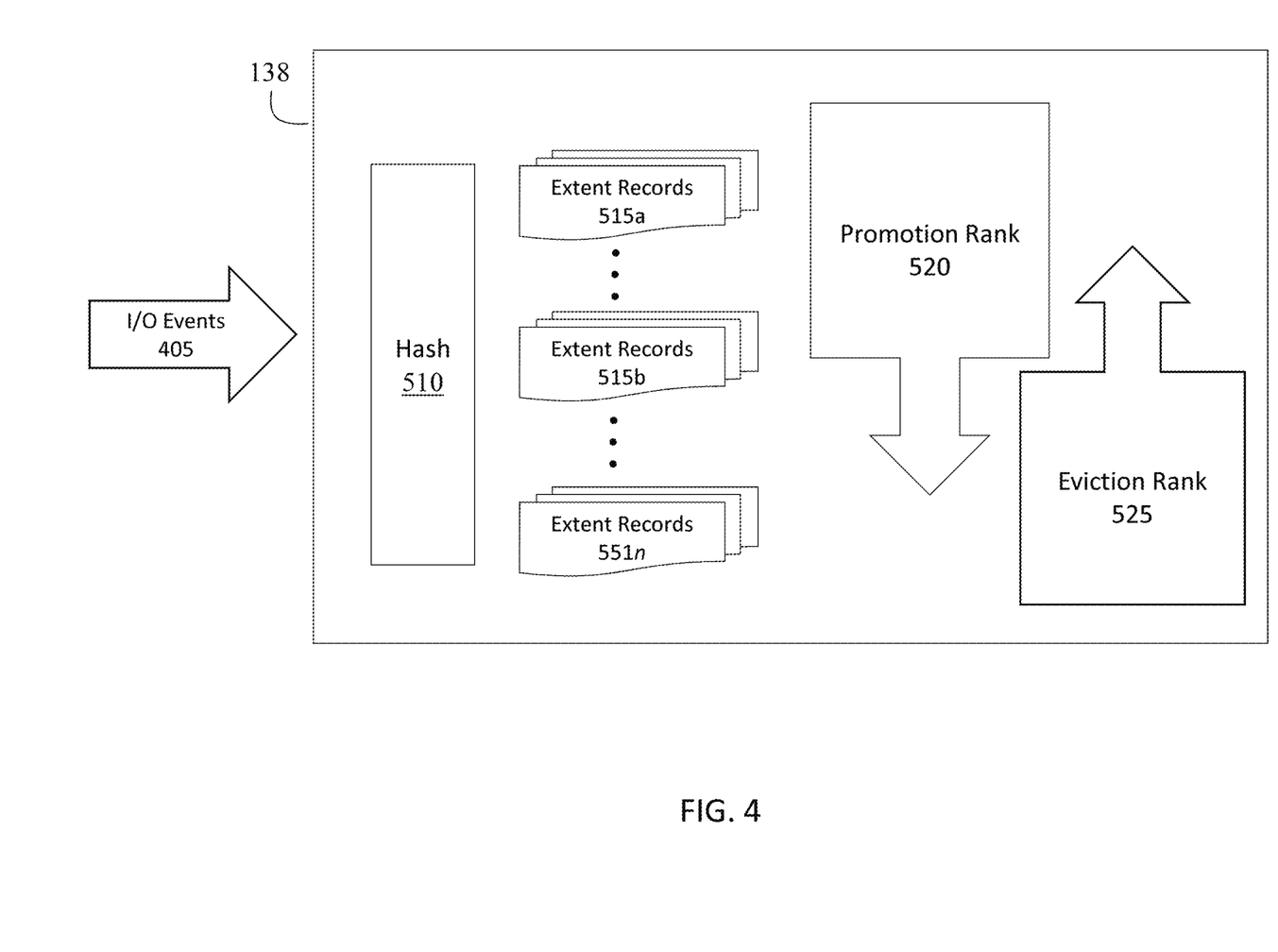
FIG. 4 is a block diagram of a memory optimizer in accordance with example embodiments disclosed herein.

Referring to FIG. 4, a memory optimizer 138 receives one or more I/O events (e.g., I/O operations) 405 corresponding to data units from an I/O stream (e.g., I/O stream 315 of FIG. 3). As discussed herein, a memory manager (e.g., the manager 134 of FIG. 2) generates events from the I/O stream. For each event, the memory optimizer allocates an extent associated with each event in a searchable data structure, e.g., a hash 510. It should be noted any searchable data structure can be used by the optimizer 138. The allocation can be performed according to the method 500 discussed herein with respect to FIG. 5.

Each extent can be stored as an extent record and can include one or more of: device and/or track information, an access timestamp, an I/O count (e.g., an amount of I/O operations received over a period with respect to each extent), a track density mask, and a duration of storage in the hash and/or a given storage medium, amongst other information. In embodiments, the memory optimizer 138 can determine a track density mask by using a bit mask having, e.g., 64 bits that corresponds to each extent. For example, each extent can cover multiple tracks, e.g., sixty-four (64). Thus, each bit of the bitmask can correspond to an individual track. Each track can include counters, which can be shared amongst each track using any known technique. For each event occurrence, the memory optimizer 138 can randomly set a bit of the bitmask with an X % (e.g., 10%) probability, i.e., whether the bit is a 1 vs. a 0, or vice versa. The memory optimizer 138 can compare extents based on each extent's score and number of bits set in each extent's bit mask to determine each extent's track density score. In embodiments, the optimizer 138 can divide each extent's score by the number of bits set for each extent's corresponding bitmask. For example, if a first extent has a single I/O operation per track (i.e., 64 I/Os in total), the optimizer 138 using, e.g., a 10% probability, can set about 6 bits for the first event's corresponding bitmask. For a second event that has, e.g., sixty (60) I/O operations directed to a first track, and four (4) to a second track, the optimizer 138 may only set a single bit for the second event's corresponding bitmask. Accordingly, the optimizer 138 can determine that the first extent's track density score is 10.7 (i.e., 64/6) and the second extent's track density score is 64 (i.e., 64/1). Because each extent has the same count (i.e., total I/O operations), the optimizer 138 can rank them based on their track density and, in this example, determine that the second extent is the busier one.

For each extent record, the memory optimizer 138 provides one or more of: a promotion rank 520 and an eviction rank 525. The promotion ranks 520 and eviction ranks 525 are sorted in one more data structures linked to the hash 510. In embodiments, the promotion ranks 520 and eviction ranks 525 can be stored in one or more linked lists (e.g., a promotion data structure and an eviction data structure).

The promotion rank 520 and eviction rank 525 for each extent can be determined based on the information included in each extent record. For example, the promotion rank 520 and eviction ranks 525 can be determined based on each extent's relative position in the promotion and eviction data structures (e.g., linked lists), respectively. The position can be based on historical I/O behavior with respect to each extent. For example, the optimizer 138 places each new extent at a location in the eviction rank data structure (e.g., top) to indicate that it is least likely to be evicted. The optimizer 38 also places each new extent at a location in the promotion rank data structure (e.g., bottom) to indicate that it must demonstrate activity to be promoted. The data structures can be a dual linked list that include a first linked list and a second linked list. The first linked list can include a set of pointers that can be traversed from start to end to represent the busiest extents. The second linked list can also include a set of pointers that can similarly be traversed to the least active extents. Once the rankings 520, 525 are determined, the optimizer 138 can manipulate each ranking list by adjusting pointers from each extent stored in the hash to each ranking linked list.

Figure 6:
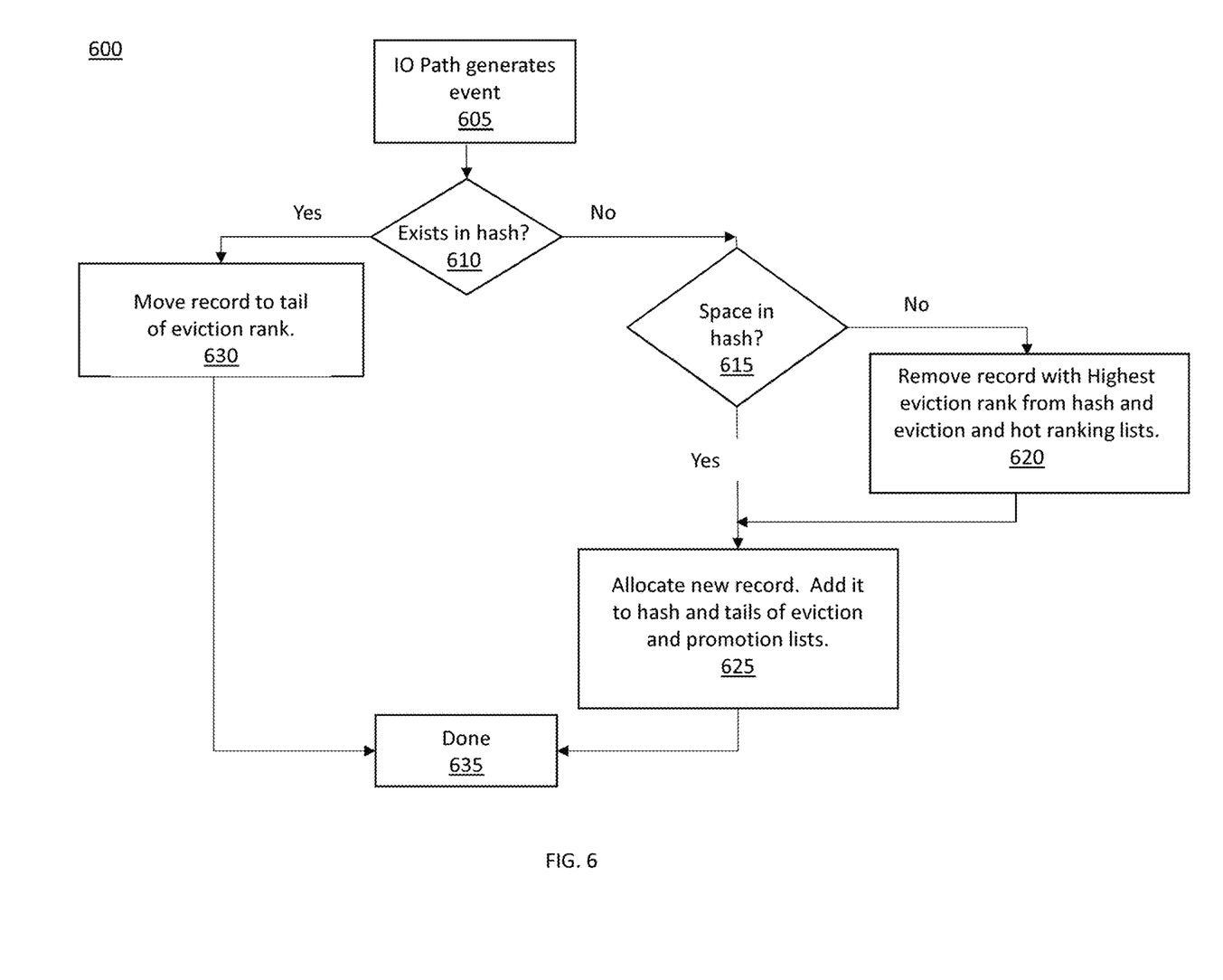
FIG. 6 is a flow diagram of an example method for updating a data structure used for active data storage management in accordance with example embodiments disclosed herein.

Depending on an availability of memory allocated for use by the hash 510, the optimizer 138 may evict one or more extent records from the hash, e.g., according to the method 600 discussed herein with respect to FIG. 6. Further, the optimizer 138 can migrate tracks associated with each extent between fast storage media and slow storage media according to the method 700 discussed herein with respect to FIG. 7.

FIGS. 5-8 illustrates methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

Figure 5:
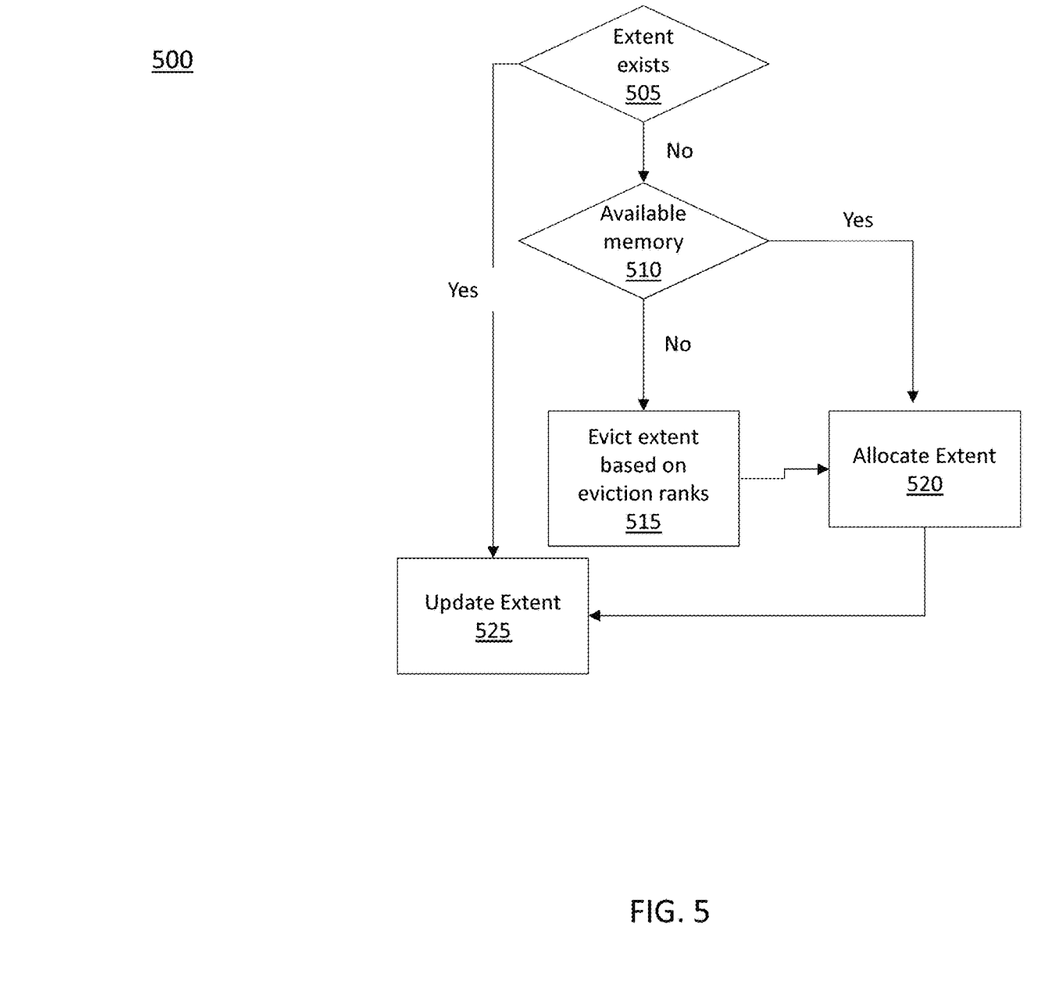
FIG. 5 is a flow diagram of an example method for active data storage management in accordance with example embodiments disclosed herein.

Referring to FIG. 5, in embodiments, a method 500 can be executed by a memory management processor (e.g., the memory management processor 22a of FIG. 1). For each extent associated with a data unit of an I/O stream (e.g., I/O stream 315 of FIG. 3), the method 500, at 505, can include determining whether each extent exists in a data structure (e.g., the hash 510 of FIG. 4), e.g., by performing a search of the hash. If the extent exists, the method 500, at 525, can include updating information associated with the extent stored in the data structure. For example, the method 500, at 520, can include updating the extent with information related to the access request to, e.g., update all ranking scores associated with the extent. For example, the information can include timestamps, I/O counts, and density masks. If, at 505, it is determined that the extent does not exist, the method 500, at 510, can include determining if there is available memory to store the extent in the data structure. If there is available memory, the method 500, at 520, can include allocating the extent into a position in the data structure according to the embodiments described herein. The method 500, at 525, can include updating information associated with the extent stored in the data structure as described above. If, at 510, it is determined that there is insufficient memory available to store the extent in the data structure, the method 500, at 515, can include evicting an existing extent from the data structure based on each existing extent's eviction rank. At, 520, the method 500, can then include allocating the extent into a position within the data structure.

It should be noted that each of the steps 505, 510, 515, 520, and 525 of the method 500 can be performed according to any of the embodiments described herein, known to those skilled in the art, and/or yet to be known to those skilled in the art.

Referring to FIG. 6, in embodiments, a method 600 can be executed by a memory management processor and any element therein (e.g., the memory management processor 22a and elements 134 and 138 of FIG. 2). The method 600, at 605, can include generating at least one event (e.g., I/O operation with respect to a data unit) from an I/O stream via an I/O processing path of a data storage system (e.g., system 12 of FIG. 1). For example, a host (e.g., one of the hosts 14a-n of FIG. 1) can generate an event (e.g., I/O operation) using an application run by the host. The I/O processing path can start from a host based on events generated from applications run by the host and continue to and throughout the storage system (e.g., from the HA 21 to the storage devices 16a-n of FIG. 1). For each event generated, the method 600, at 610, can include determining whether an extent associated with the event exists in a data structure (e.g., the hash 510 of FIG. 4), e.g., by performing a search of the data structure. If the extent exists, the method 600, at 630, can include adding a data record associated with the extent to an eviction data structure. The eviction data structure can order extents based on an eviction score (e.g., rank). In embodiments, a position within the eviction data structure can indicate an eviction rank. In the example illustrated by FIG. 6, a tail of the data structure indicates a record with a lowest eviction rank (i.e., least likely to be evicted) and a head of the data structure indicates a record with a highest eviction rank (i.e., most likely to be evicted). However, a skilled artisan understands that any known embodiment can be used to rank records within a data structure. At 635, the method 600 ends. If, at 610, it is determined that the extent does not exist, the method 600, at 615, can include determining if there is available memory to store the extent in the data structure. If there is available memory, the method 600, at 625, can include allocating the extent into a position in the hash, an eviction data structure, and a promotion data structure according to the embodiments described herein. At 635, the method 600 ends. If, at 615, it is determined that there is insufficient memory available, the method 600, at 620, can include evicting an existing extent from the hash, the eviction data structure, and the promotion data structure based on each existing extent's eviction rank. For example, a head of the eviction data structure can correspond to an extent record with a highest eviction rank and thus, is evicted. The method 600 can then continue with steps 625 and 635 as described above.

It should be noted that each of the steps 605, 610, 615, 620, 625, 630, and 635 of the method 600 can be performed according to any of the embodiments described herein, known to those skilled in the art, and/or yet to be known to those skilled in the art.

Figure 7:
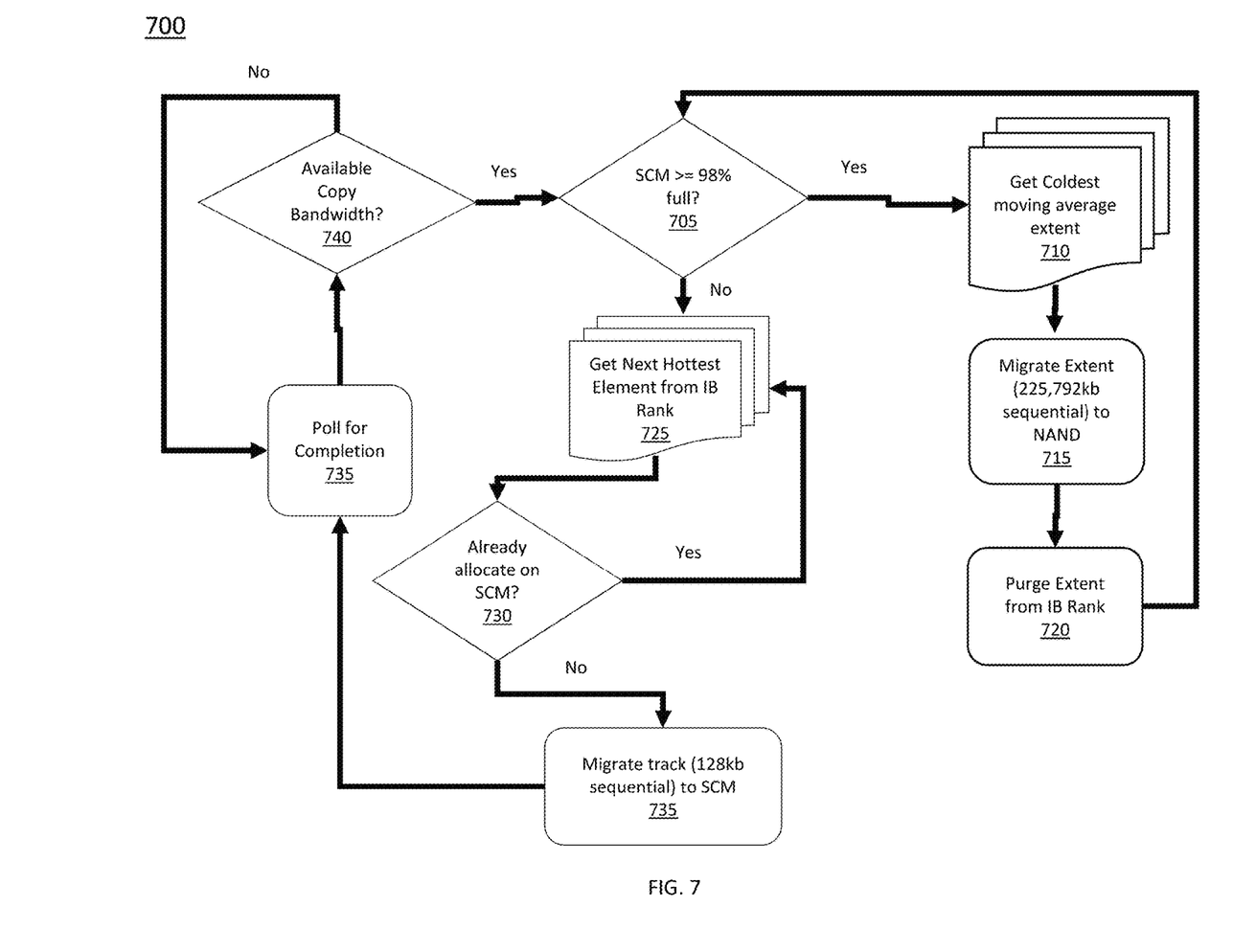
FIG. 7 is a flow diagram for migrating tracks between storage media for active data storage management in accordance with example embodiments disclosed herein.

Referring to FIG. 7, in embodiments, a method 700 can be executed by a memory management processor and any element therein (e.g., the memory management processor 22a and elements 134 and 138 of FIG. 2). The method 700, at 705, can include determining if a fast storage media (e.g., storage class media (SCM)) reached or is above a threshold capacity level (e.g., at or above 98% capacity) using any known or yet to be known embodiment for monitoring storage media capacity. If not, the method 700, at 725, can include obtaining a record (e.g., extent) from a data structure (e.g., hash 510 of FIG. 5) and/or a promotion data structure with a highest promotion rank. At 730, the method 700 can include determining whether the record is already allocated (e.g., stores) on the fast storage media (e.g., by performing a search of the storage media or a data structure identifying data being stored by the storage media). If so, the method 700 returns to step 725. If not, the method 700 can include migrating a track associated with the record to the fast storage media. The migration can be performed using any known or yet to be known embodiment. The method 700, at 735, polls the migration process to determine whether the migration is complete. For example, the storage system can include a request handling system that monitors the migration process according to known techniques. Contemporaneously, the method 700, at 740, determines if there is available bandwidth (e.g., copy bandwidth) to perform additional migrations. For example, the method 700, at 740, can determine the available bandwidth based on a size of the system (e.g., system 12 of FIG. 1) and amount of processing engines included in the system. If yes, the method 700 can continue to step 705. If not, the method 700 can continue at step 735. Referring to step 705, if it is determined that the fast storage media has reached or is above the threshold capacity, the method 700 can include determining and obtaining an extent from the fast storage media that has a coldest moving average. At 715, the method 700 can include migrating the extent with the coldest moving average to a slow storage media (e.g., NAND). The method 700, at 720, can further include purging a record associated with the migrated extent from the hash and/or promotion data structures.

It should be noted that each of the steps 705, 710, 715, 720, 725, 730, 735, and 740 of the method 700 can be performed according to any of the embodiments described herein, known to those skilled in the art, and/or yet to be known to those skilled in the art.

Figure 8:
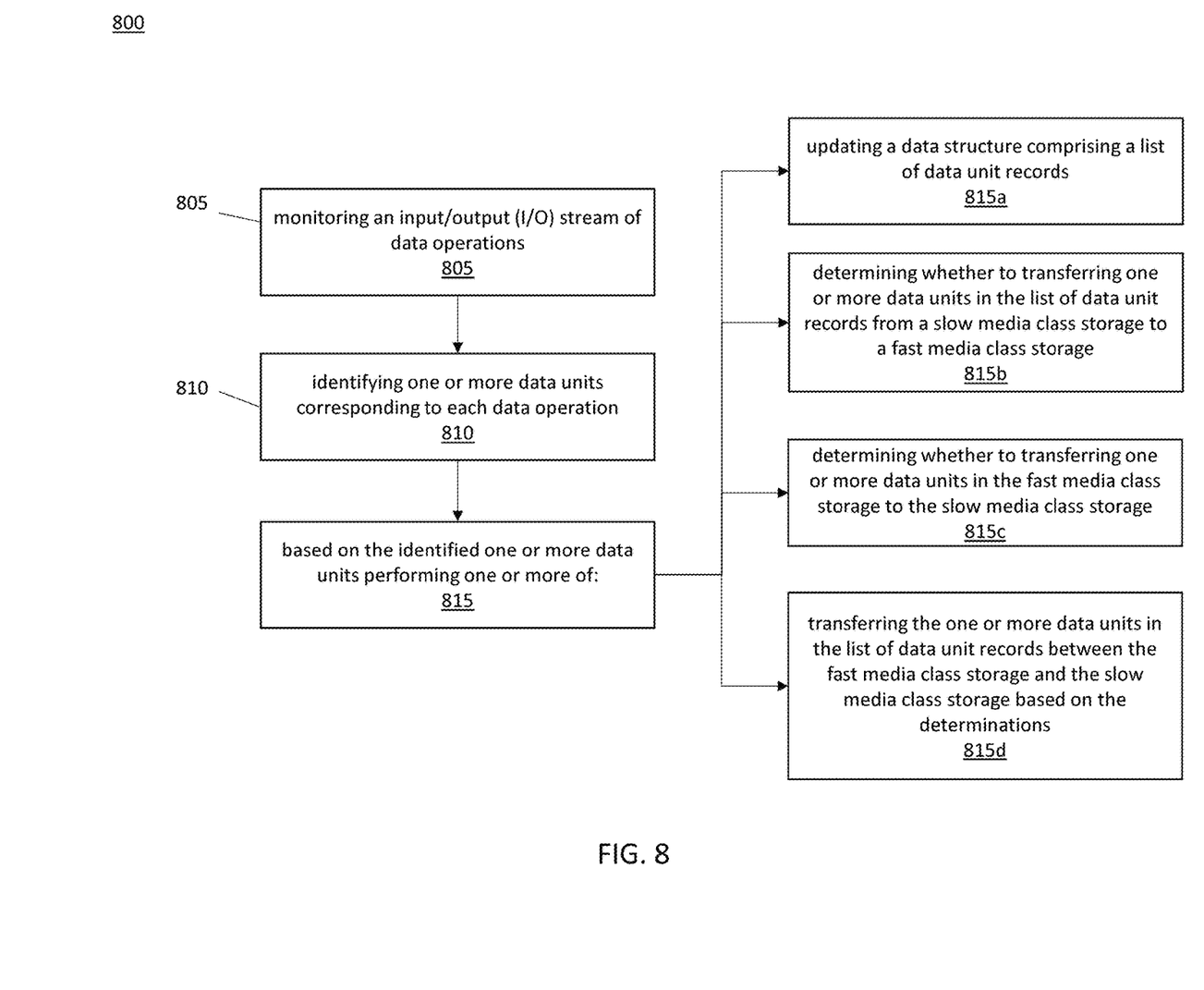
FIG. 8 is a flow diagram for another example method for active data storage management in accordance with example embodiments disclosed herein.

Referring to FIG. 8, in embodiments, a method 800 can be executed by a memory management processor and any element therein (e.g., the memory management processor 22a and elements 134 and 138 of FIG. 2). The method 800, at 805, can include monitoring an input/output (I/O) stream of data operations (e.g., events). The method 800, at 810, can also include identifying one or more data units corresponding to each data operation. Based on the identified one or more data units, the method 800, at 815, can include performing one or more of: updating a data structure comprising a list of data unit records (815a), determining whether to transferring one or more data units in the list of data unit records from a slow media class storage to a fast media class storage (815b), determining whether to transferring one or more data units in the fast media class storage to the slow media class storage (815c), and transferring the one or more data units in the list of data unit records between the fast media class storage and the slow media class storage based on the determinations (815d).

It should be noted that each of the steps 805, 710, 815, and 815a-d of the method 800 can be performed according to any of the embodiments described herein, known to those skilled in the art, and/or yet to be known to those skilled in the art.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described embodiments can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described embodiments can be implemented in a distributed computing system that includes a back-end component. The back-end component can, for example, be a data server, a middleware component, and/or an application server. The above described embodiments can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising a memory and at least one processor configured to:
   monitor an input/output (I/O) stream of data operations, wherein one or more data units correspond to each data operation;
   generate an event for each data operation in the I/O stream;
   identify each data unit's corresponding track and extent using one or more target address spaces of each data unit's corresponding data operation;
   maintain at least one data structure, including a list of data unit records, wherein the data structure maps each data unit record to at least its corresponding track, extent, media class, and duration of storage in a media class, and wherein maintaining the at least one data structure includes ordering the data units by a time of their stay in a storage media corresponding to the at least one data structure;
   provide each record with a promotion or eviction rank based at least on each record's corresponding duration in the media class and extent's track density, wherein providing each record with a promotion or eviction rank includes determining the track density using a bit mask corresponding to each record's corresponding extent; and
   transfer one or more data units in the list between fast and slow media class storage based on their respective promotion or eviction ranks, wherein transferring the one or more data units includes using the at least one data structure to limit central processing unit (CPU) utilization.

2. The apparatus of claim 1 further configured to generate an I/O record for each data operation.

3. The apparatus of claim 1 further configured to identify the one or more data units corresponding to each data operation and an extent corresponding to each data based on address information included in an I/O record.

4. The apparatus of claim 3 further configured to:
   determine whether each extent corresponding to each data unit of the I/O stream is stored in the data structure;
   based on the determination, perform one or more of:
      add each data unit record from the I/O stream not included in the list of data unit records;
      remove a previously stored data unit record from the data structure;
      update a storage promotion rank for each data unit record in the data structure; and
      update an eviction rank for each data unit record in the data structure.

5. The apparatus of claim 4 further configured to transfer the one or more data units in the list of data unit records from the slow media class storage to the fast media class storage based on the storage promotion rank of each data unit record.

6. The apparatus of claim 5 further configured to transfer one or more data units from the fast media class storage to the slow media class storage based on the storage promotion rank of each data unit record stored in the fast media class storage.

7. The apparatus of claim 6 further configured to evict the one or more data unit records from the data structure based on the eviction rank of each data unit record.

8. The apparatus of claim 4 further configured to remove one or more previously stored data unit records from the data structure based on available memory associated with the data structure.

9. The apparatus of claim 1 further configured to add a data unit record for each of the one or more data units transferred from the fast media class storage to the slow media class storage to the data structure based on each of the one or more data unit's promotion rank.

10. The apparatus of claim 9 further configured to:
add the data unit record for each of the one or more data units transferred from the fast media class storage to the slow media class to the data structure; and
remove an amount of previously stored data unit records from the data structure based on one or more of:
an eviction rank of each previously stored data unit record,
the available memory associated with the data structure, and
an amount of data unit records transferred from the fast media class to the slow media class.

11. A method comprising:
monitoring an input/output (I/O) stream of data operations, wherein one or more data units correspond to each data operation;
generating an event for each data operation in the I/O stream and corresponding target address spaces;
identifying each data unit's corresponding track and extent using one or more target address spaces of each data unit's corresponding data operation;
maintaining at least one data structure, including a list of data unit records, wherein the data structure maps each data unit record to at least its corresponding track, extent, media class, and duration in a media class, and wherein maintaining the at least one data structure includes ordering the data units by a time of their stay in a storage media corresponding to the at least one data structure;
providing each record with a promotion or eviction rank based at least on each record's corresponding duration in the media class and extent's track density, wherein providing each record with a promotion or eviction rank includes determining the track density using a bit mask corresponding to each record's corresponding extent; and
transferring one or more data units in the list between fast and slow media class storage based on their respective promotion or eviction ranks, wherein transferring the one or more data units includes using the at least one data structure to limit central processing unit (CPU) utilization.

12. The method of claim 11 further comprising generating an I/O record for each data operation.

13. The method of claim 11 further comprising identifying the one or more data units corresponding to each data operation and an extent corresponding to each data based on address information included in an I/O record.

14. The method of claim 13 further comprising:
determining whether each extent corresponding to each data unit of the I/O stream is stored in the data structure;
based on the determination, perform one or more of:
adding each data unit record from the I/O stream not included in the list of data unit records;
removing a previously stored data unit record from the data structure;
updating a storage promotion rank for each data unit record in the data structure; and
updating an eviction rank for each data unit record in the data structure.

15. The method of claim 14 further comprising transferring the one or more data units in the list of data unit records from the slow media class storage to the fast media class storage based on the storage promotion rank of each data unit record.

16. The method of claim 15 further comprising transferring one or more data units from the fast media class storage to the slow media class storage based on the storage promotion rank of each data unit record stored in the fast media class storage.

17. The method of claim 16 further comprising evicting the one or more data unit records from the data structure based on the eviction rank of each data unit record.

18. The method of claim 14 further comprising removing one or more previously stored data unit records from the data structure based on available memory associated with the data structure.

19. The method of claim 11 further comprising adding a data unit record for each of the one or more data units transferred from the fast media class storage to the slow media class storage to the data structure based on each of the one or more data unit's promotion rank.

20. The method of claim 19 further comprising:
adding the data unit record for each of the one or more data units transferred from the fast media class storage to the slow media class to the data structure; and
removing an amount of previously stored data unit records from the data structure based on one or more of:
an eviction rank of each previously stored data unit record,
the available memory associated with the data structure, and
an amount of data unit records transferred from the fast media class to the slow media class.

* * * * *